US012592742B2

(12) United States Patent
Ho et al.

(10) Patent No.: US 12,592,742 B2
(45) Date of Patent: Mar. 31, 2026

(54) COMMUNICATION DEVICE AND MULTI-LINK DATA TRANSMISSION METHOD

(71) Applicant: REALTEK SEMICONDUCTOR CORPORATION, Hsinchu (TW)

(72) Inventors: Chih-Hsiang Ho, Hsinchu (TW); Hsiu-Ting Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/811,845

(22) Filed: Aug. 22, 2024

(65) Prior Publication Data

US 2025/0080155 A1     Mar. 6, 2025

(30) Foreign Application Priority Data

Aug. 28, 2023    (TW) ................................. 112132343

(51) Int. Cl.
*H04B 1/40*        (2015.01)
*H04L 47/34*       (2022.01)
*H04W 76/15*       (2018.01)

(52) U.S. Cl.
CPC .............. *H04B 1/40* (2013.01); *H04L 47/34* (2013.01); *H04W 76/15* (2018.02)

(58) Field of Classification Search
CPC ........... H04B 1/40; H04L 47/34; H04W 76/15

USPC ..................................................... 375/219–220
See application file for complete search history.

(56) References Cited

U.S. PATENT DOCUMENTS

| | | | | |
|---|---|---|---|---|
| 2015/0358778 A1* | 12/2015 | Heo | ....................... | H04W 4/027 |
| | | | | 455/456.6 |
| 2021/0144589 A1* | 5/2021 | Seok | .................... | H04W 28/065 |
| 2021/0195540 A1* | 6/2021 | Fischer | ............. | H04W 56/0005 |
| 2021/0211375 A1* | 7/2021 | Kwon | ................. | H04W 72/535 |
| 2022/0014971 A1* | 1/2022 | Tang | ..................... | H04W 76/30 |
| 2022/0255849 A1* | 8/2022 | Huang | .................. | H04W 84/12 |
| 2023/0292238 A1* | 9/2023 | Shafin | ............... | H04W 52/0229 |

FOREIGN PATENT DOCUMENTS

CN        115280840 A      11/2022

OTHER PUBLICATIONS

OA letter of a counterpart TW application (appl. No. 112132343) mailed on Feb. 6, 2024.

* cited by examiner

*Primary Examiner* — Emmanuel Bayard
(74) *Attorney, Agent, or Firm* — WPAT, PC

(57)        ABSTRACT

A multi-link data transmission method includes the following operations: transmitting a first data to an electronic device via a first link; transmitting a second data to the electronic device via a second link, wherein the first data and the second data have the same content; and receiving a first response corresponding to the first data from the electronic device via the first link, and stopping transmitting the second data according to the first response.

18 Claims, 5 Drawing Sheets

Communication device 100                    Electronic device 100A

300

S310

Transmit first data to electronic device via first link

S320

Transmit second data to electronic device via second link, in which first data and second data have the same content

S330

Receive first response corresponding to first data from electronic device via first link and stop transmitting second data according to first response

COMMUNICATION DEVICE AND MULTI-LINK DATA TRANSMISSION METHOD

BACKGROUND OF THE INVENTION

1. Field of the Invention

The present disclosure relates to a communication device, especially to a communication device and a multi-link data transmission method thereof that utilize multiple links to transmit data.

2. Description of Related Art

In new wireless communication protocols (e.g., Wi-Fi 7), if an electronic device supports multi-link operation(s), the electronic device may allocate data to be transmitted to different links. In practical applications, this electronic device is required to utilize a relatively complex algorithm to select the appropriate links for executing the multi-link operation. However, if the algorithm is too complex, it will lead to delays in data transmission or increase hardware costs. On the other hand, if the algorithm is not precise enough, it will lead to data loss and excessive retransmissions.

SUMMARY OF THE INVENTION

In some aspects of the present disclosure, an object of the present disclosure is, but not limited to, provide a communication device, especially to a communication device and a multi-link data transmission method thereof that utilize multiple links to transmit data, so as to make an improvement to the prior art.

In some aspects of the present disclosure, a communication device includes a transceiver circuit and a controller circuit. The transceiver circuit is configured to wirelessly communicate with an electronic device via a first link and a second link. The controller circuit is configured to control the transceiver circuit to transmit a first data to the electronic device via the first link and transmit a second data to the electronic device via the second link, receive a first response corresponding to the first data via the first link from the electronic device, and stop transmitting the second data according to the first response. The first data and the second data have the same content.

In some aspects of the present disclosure, a multi-link data transmission method includes the following operations: transmitting a first data to an electronic device via a first link; transmitting a second data to the electronic device via a second link, wherein the first data and the second data have the same content; and receiving a first response corresponding to the first data from the electronic device via the first link, and stopping transmitting the second data according to the first response.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
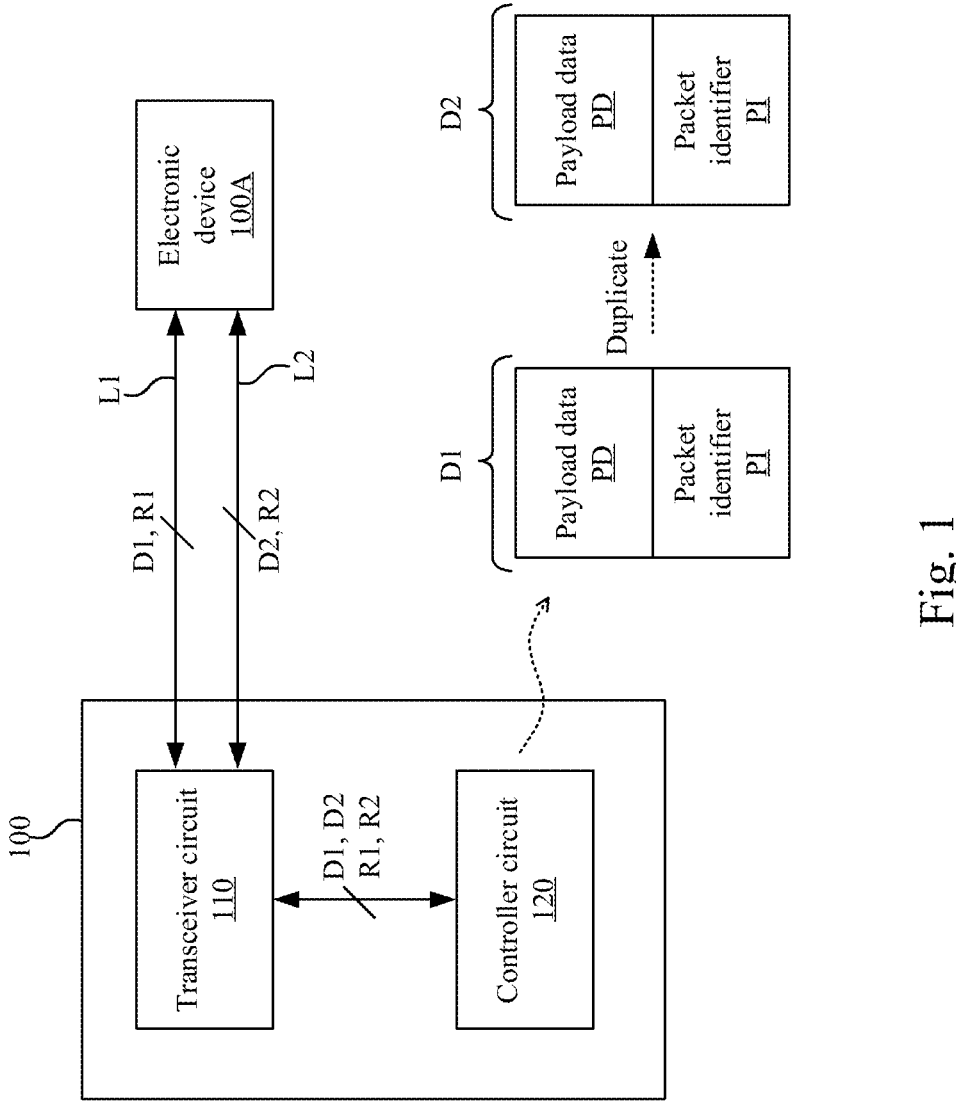
FIG. 1 illustrates a schematic diagram of a communication device according to some embodiments of the present disclosure.

FIG. 1 illustrates a schematic diagram of a communication device 100 according to some embodiments of the present disclosure. In some embodiments, the communication device 100 may connect to an electronic device 100A via a wireless communication network protocol (e.g., Wi-Fi). For example, the communication device 100 may wirelessly communicate with the electronic device 100A via links L1 and L2 established based on the IEEE 802.11 standard (i.e., wirelessly connecting to the electronic device 100A). In some embodiments, the links L1 and L2 are channels corresponding to different frequency bands. For example, the link L1 may be a channel in the 2.4G frequency band, and the link L2 may be a channel in the 5G or 6G frequency band. The frequency band values for the links L1 and L2 and the number of links in FIG. 1, are given for illustrative purposes, and the present disclosure is not limited thereto. In different embodiments, the communication device 100 may wirelessly communicate with the electronic device 100A via two or more links. In some embodiments, the communication device 100 may be, but is not limited to, a consumer electronic device with wireless communication capabilities. In some embodiments, the communication device 100 may be, but is not limited to, a station. In some embodiments, the electronic device 100A may be, but is not limited to, a wireless access point.

In some embodiments, the communication device 100 includes a transceiver circuit 110 and a controller circuit 120. The transceiver circuit 110 may wirelessly communicate with the electronic device 100A via the links L1 and L2 to exchange (transmit and/or receive) data with the electronic device 100A. The controller circuit 120 is configured to control the transceiver circuit 110 to transmit a data D1 to the electronic device 100A via the link L1, and to transmit a data D2 to the electronic device 100A via the link L2. In some embodiments, the transceiver circuit 110 may be implemented with transmitter and receiver circuits that support wireless communication. In some embodiments, the controller circuit 120 may be implemented with at least one processing circuit that executes a specific control algorithm (e.g., operations in FIG. 3). In some embodiments, the controller circuit 120 may be implemented with an application specific integrated circuit (ASIC). In some embodiments, the controller circuit 120 may be implemented with a combination of software and hardware.

In some embodiments, the controller circuit 120 may control the transceiver circuit 110 to transmit data over multiple links. In some embodiments, the data D1 may be considered more important by upper-layer application(s). Under this condition, the controller circuit 120 may duplicate (i.e., copy) the data D1 to generate the data D2, in which the data D1 and the data D2 have the same content. For example, the data D1 and the data D2 have the same payload data PD and packet identifier PI. In some embodiments, the payload data PD is the actual information to be transmitted. In some embodiments, the packet identifier PI may be configured to identify different packets. That is, the packet identifier PI may be regarded as an identity code for a packet, which may be utilized to distinguish different packets, such as indicating whether the data D1 and the data D2 are the same. In data transmission, a receiver device (e.g., the electronic device 100A) may determine whether identical packets have been received according to the packet identifier of the received packets. In some embodiments, the packet identifier PI may be, but is not limited to, a sequence number in the Wi-Fi protocol. In some embodiments, the electronic device 100A is further configured to determine, after receiving the data D1 and the data D2, whether to delete a later received one of the data D1 and the data D2 according to the packet identifiers PI of the data D1 and the data D2. For example, a driver of the electronic device 100A is configured to determine whether the received data D1 and data D2 are the same. If the packet identifiers PI of both the data D1 and the data D2 are the same, it indicates that the received data D1 and data D2 are duplicate data. Under this condition, the electronic device 100A may delete the later received one of the data D1 and the data D2 (or delete either one of the data D1 and the data D2). Alternatively, if the packet identifiers PI of both the data D1 and the data D2 are not the same, it indicates that the received data D1 and data D2 are two different data. Under this condition, the electronic device 100A may not delete the data D1 and the data D2.

In some embodiments, the controller circuit 120 further utilizes the transceiver circuit 110 to receive a response generated by the electronic device 100A according to the data D1 or the data D2, and selectively controls the transceiver circuit 110 to stop transmitting a corresponding one of the data D1 and the data D2 according to this response. In greater detail, after the electronic device 100A receives the data D1, the electronic device 100A transmits a response R1 to the transceiver circuit 110 via the link L1, in order to notify the communication device 100 that the data D1 has been successfully received. Similarly, after the electronic device 100A receives the data D2, the electronic device 100A transmits a response R2 to the transceiver circuit 110 via the link L2, in order to notify the communication device 100 that the data D2 has been successfully received. In other words, when the transceiver circuit 110 receives the response R1, it indicates that the electronic device 100A has received the data D1. Under this condition, if the transceiver circuit 110 has not yet successfully transmitted the data D2 (or if the controller circuit 120 cannot determine that the electronic device 100A has successfully received data D2), the controller circuit 120 may control the transceiver circuit 110 to stop transmitting the data D2. Alternatively, when the transceiver circuit 110 receives the response R2, it indicates that the electronic device 100A has received the data D2. Under this condition, if the transceiver circuit 110 has not yet successfully transmitted the data D1 (or if the controller circuit 120 cannot determine that the electronic device 100A has successfully received the data D1), the controller circuit 120 may control the transceiver circuit 110 to stop transmitting the data D1. As data D1 is identical to data D2, when the electronic device 100A has successfully received one of the data D1 or the data D2, the controller circuit 120 may stop the transceiver circuit 110 from transmitting the other one of the data D1 or the data D2. Thus, the communication device 100 may transmit data via multiple links, ensuring the reliability of data transmission and avoiding excessive retransmissions or delays.

In some embodiments, the aforementioned responses R1 and R2 may be acknowledgement (ACK) frames in the Wi-Fi protocol. For example, the transceiver circuit 110 may exchange the data D1 and the data D2 with the electronic device 100A based on a general acknowledgement mechanism. As mentioned above, when the electronic device 100A successfully receives the data D1, the electronic device 100A transmits the response R1 to the transceiver circuit 110, thereby indicating successful receipt of the data D1. Similarly, when the electronic device 100A successfully receives the data D2, the electronic device 100A transmits response R2 to the transceiver circuit 110, thereby indicating successful receipt of the data D2. In some other embodiments, the aforementioned responses R1 and R2 may be block acknowledgement (BA) frames in the Wi-Fi protocol. For example, the transceiver circuit 110 may exchange the data D1 and the data D2 with the electronic device 100A based on a block acknowledgement mechanism, where the data D1 and the data D2 are transmitted to the electronic device 100A in the form of aggregate media access control protocol data units (A-MPDU). The transceiver circuit 110 transmits the data D1 and the data D2 to the electronic device 100A, and the electronic device 100A may return a block acknowledgement frame to indicate whether the data D1 and the data D2 are received. In this example, the response R1 may be at least one first bit in the bitmap field of the block acknowledgement frame, and the response R2 may be at least one second bit in the bitmap field of the block acknowledgement frame. When the electronic device 100A successfully receives the data D1, the at least one first bit is a first logic value (e.g., a logic value of 1). Alternatively, when the electronic device 100A does not successfully receive the data D1, the at least one first bit is a second logic value (e.g., a logic value of 0). Similarly, when the electronic device 100A successfully receives the data D2, the at least one second bit is the first logic value. Alternatively, when the electronic device 100A does not successfully receive the data D2, the at least one second bit is the second logic value.

Figure 2A:
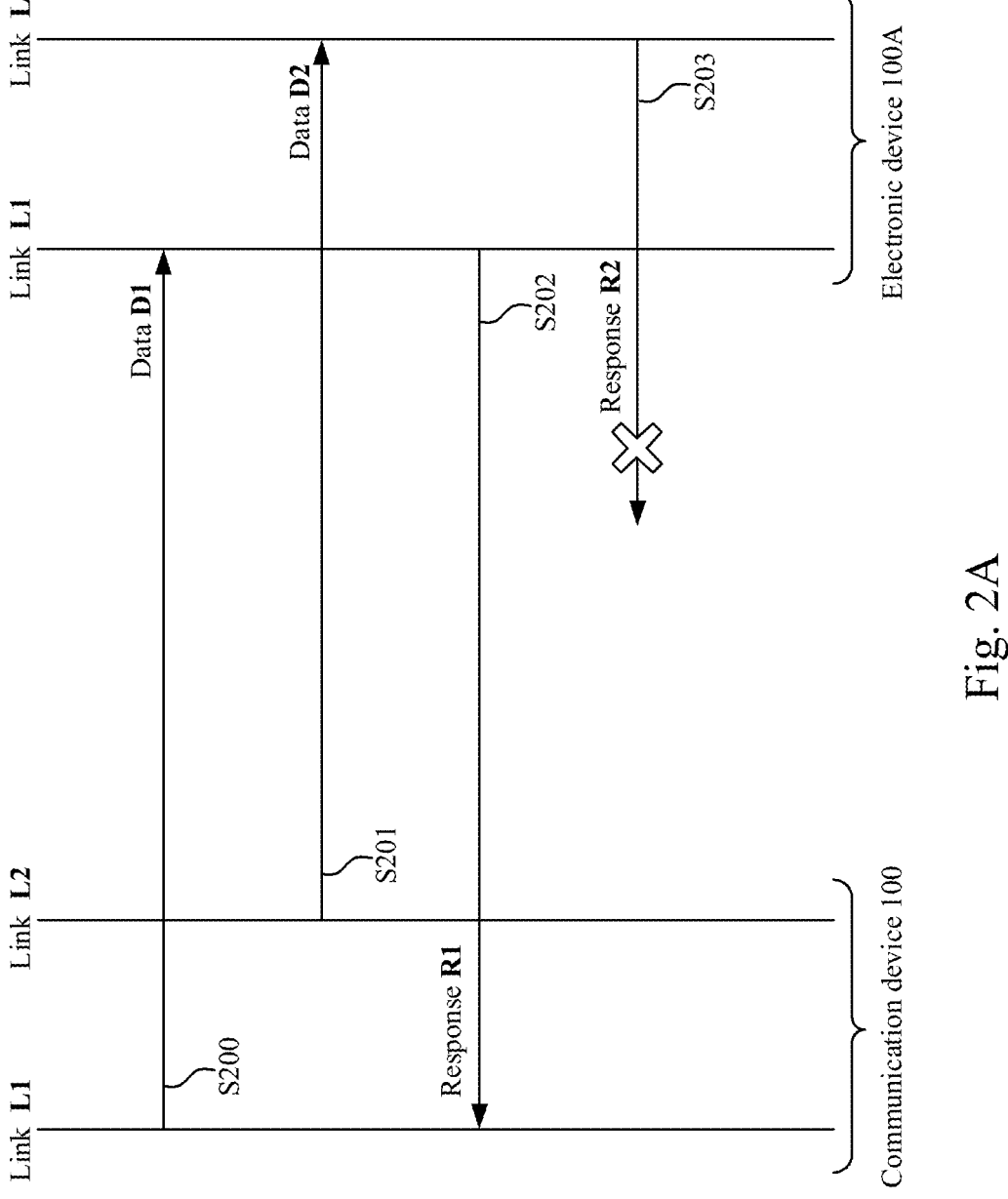
FIG. 2A illustrates a schematic diagram illustrating a first transmission scenario of first data and second data in FIG. 1 according to some embodiments of the present disclosure.

FIG. 2A illustrates a schematic diagram illustrating a first transmission scenario of the data D1 and the data D2 in FIG. 1 according to some embodiments of the present disclosure. In operations S200 and S201, the communication device 100 transmits the identical data D1 and data D2 to the electronic device 100A via the links L1 and L2, respectively. As the electronic device 100A successfully receives the data D1 via the link L1, in operation S202, the electronic device 100A transmits the response R1 to the communication device 100 via the link L1. As the electronic device 100A successfully receives the data D2 via the link L2, in operation S203, the electronic device 100A transmits the response R2 to the communication device 100 via the link L2, where the link L2 experiences interference or collisions that cause the communication device 100 to be unable to receive the response R2 successfully. In this first transmission scenario, the transceiver circuit 110 has successfully transmitted the data D1 and the data D2 to the electronic device 100A via the links L1 and L2 respectively, but the controller circuit 120 does not receive the response R2 corresponding to the data D2 issued by the electronic device 100A via the link L2, and only receives the response R1 corresponding to the data D1 transmitted by the electronic device 100A via link L1. Under this condition, as the electronic device 100A has successfully received the data D1, the controller circuit 120 may control the transceiver circuit 110 to stop transmitting data D2 according to the response R1 (rather than controlling the transceiver circuit 110 to retransmit the data D2).

Figure 2B:
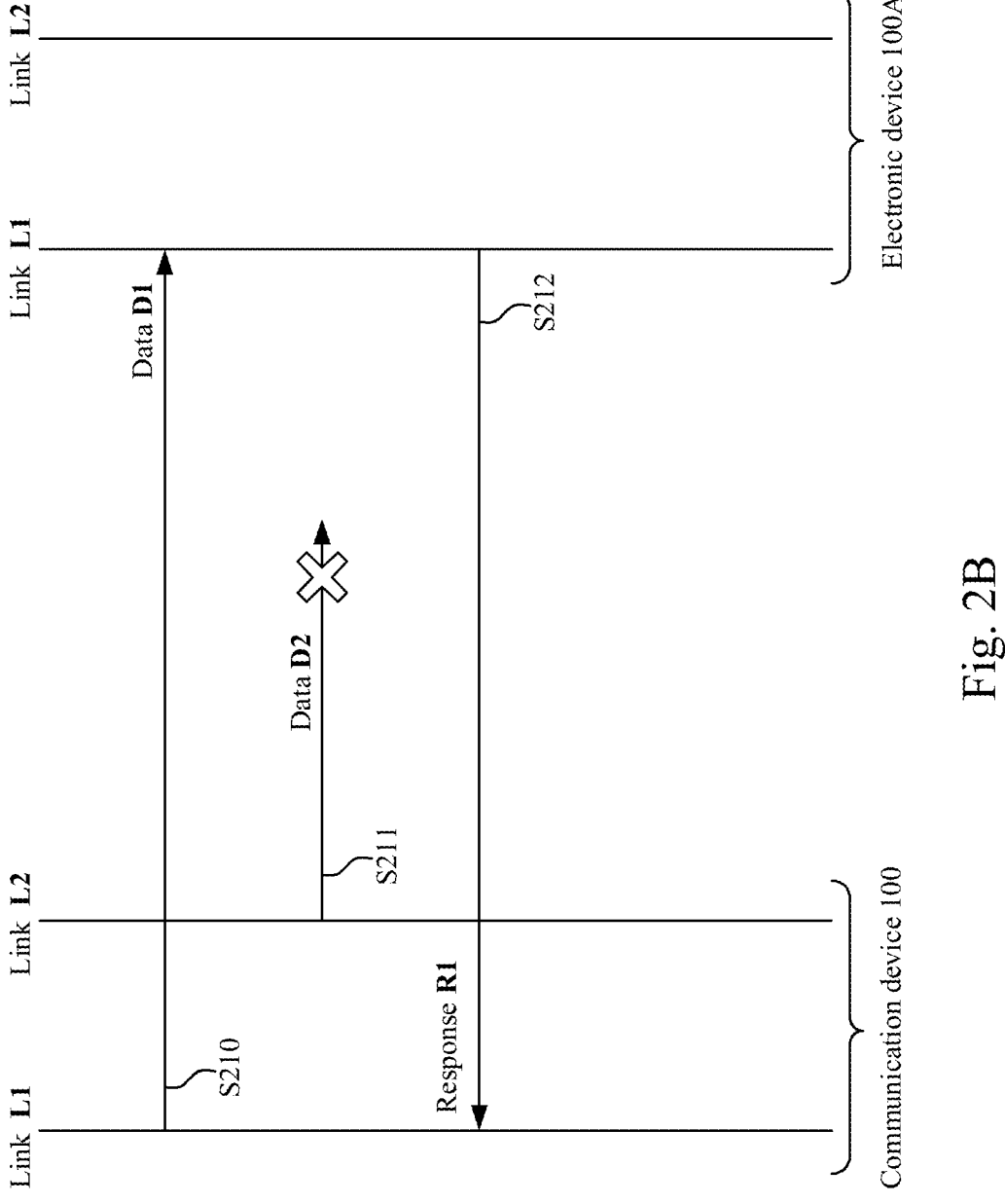
FIG. 2B illustrates a schematic diagram illustrating a second transmission scenario of first data and second data in FIG. 1 according to some embodiments of the present disclosure.

FIG. 2B illustrates a schematic diagram illustrating a second transmission scenario of the data D1 and the data D2 in FIG. 1 according to some embodiments of the present disclosure. In operations S210 and S211, the communication device 100 transmits the identical data D1 and data D2 to the electronic device 100A via the links L1 and L2, respectively, where the link L2 is affected by interference or collisions, resulting in the communication device 100 failing to successfully transmit the data D2 to the electronic device 100A. As the electronic device 100A successfully receives the data D1 via the link L1, in operation S212, the electronic device 100A transmits the response R1 to the communication device 100 via the link L1. In this second transmission scenario, the controller circuit 120 successfully transmits the data D1 to the electronic device 100A via the link L1 and has started transmitting the data D2 to the electronic device 100A via the link L2, but the controller circuit 120 does not receive the response R2 corresponding to the data D2 from the electronic device 100A via the link L2, and only receives the response R1 corresponding to the data D1 transmitted by the electronic device 100A via the link L1. Under this condition, as the electronic device 100A has successfully received the data D1, the controller circuit 120 may control the transceiver circuit 110 to stop transmitting data D2 according to the response R1 (rather than controlling the transceiver circuit 110 to retransmit the data D2).

Figure 2C:
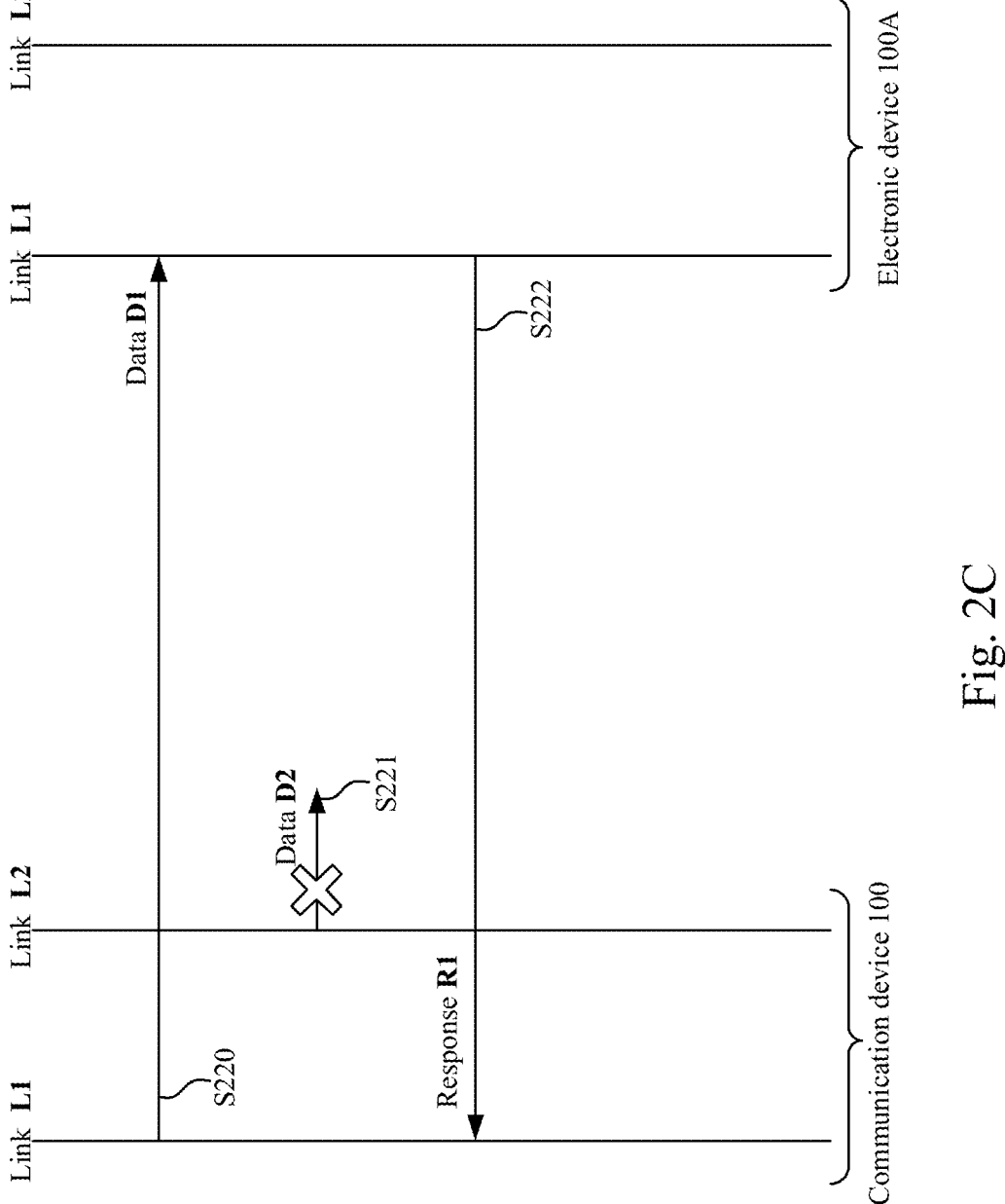
FIG. 2C illustrates a schematic diagram illustrating a third transmission scenario of first data and second data in FIG. 1 according to some embodiments of the present disclosure.

FIG. 2C illustrates a schematic diagram illustrating a third transmission scenario of the data D1 and the data D2 in FIG. 1 according to some embodiments of the present disclosure. In operations S220 and S221, the communication device 100 transmits the identical data D1 and data D2 to the electronic device 100A via the links L1 and L2, respectively. However, the link L2 experiences channel congestion (occupied by other data transmissions), causing the communication device 100 to be unable to start transmitting the data D2 via the link L2. As the electronic device 100A successfully receives the data D1 via the link L1, in operation S222, the electronic device 100A transmits the response R1 to the communication device 100 via the link L1. In this third transmission scenario, the controller circuit 120 successfully transmits the data D1 to the electronic device 100A via the link L1, and has not yet transmitted the data D2 to the electronic device 100A via the link L2, allowing the controller circuit 120 to receive the response R1 corresponding to the data D1 from the electronic device 100A via the link L1 before the transceiver circuit 110 starts transmitting the data D2 to the electronic device 100A via the link L2. Under this condition, as the electronic device 100A has successfully received data D1, the controller circuit 120 may control the transceiver circuit 110 to stop transmitting data D2 according to the response R1 (rather than controlling the transceiver circuit 110 to retransmit the data D2).

On the other hand, as previously mentioned, if the electronic device 100A successfully receives both of the data D1 and the data D2 in the above transmission scenarios, the electronic device 100A may compare the packet identifiers PI of the data D1 and the data D2. If the packet identifiers PI of those data are the same, the electronic device 100A may delete the later received one of the data D1 and the data D2 (or either one of the data D1 and the data D2). Alternatively, if the packet identifiers PI of those data are different, it indicates that the data D1 is different from the data D2, and thus the electronic device 100A does not delete the data D1 and/or the data D2. In some embodiments, the controller circuit 120 may also set a timer, and the transceiver circuit 110 may continue to transmit the data D1 and the data D2 via the links L1 and L2, respectively, until successful transmission of the data D1 and/or the data D2 before the timer expires. After the timer expires, if the transceiver circuit 110 has not successfully transmitted the data D1 and the data D2 to the electronic device 100A, the controller circuit 120 may send a message to notify the upper-layer application of the transmission failure. With the above arrangements, the communication device 100 may utilize multiple links directly to transmit data, without the need to perform complex algorithm(s) to select the appropriate link for data transmission from multiple links.

Figure 3:
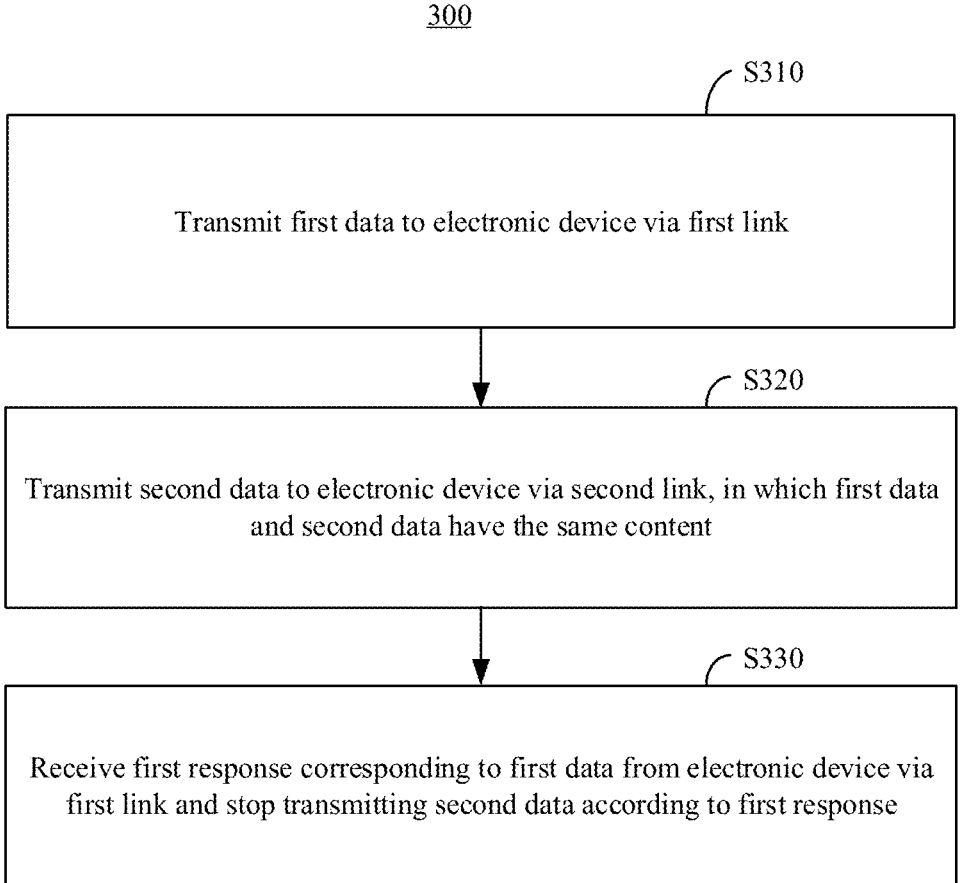
FIG. 3 illustrates a flowchart of a multi-link data transmission method according to some embodiments of the present disclosure.

FIG. 3 illustrates a flowchart of a multi-link data transmission method 300 according to some embodiments of the present disclosure. In operation S310, a first data is transmitted to an electronic device via a first link. In operation S320, a second data is transmitted to the electronic device via a second link, in which the first data and the second data have the same content. In operation S330, a first response corresponding to the first data is received from the electronic device via the first link, and the second data is stopped being transmitted according to the first response.

Operations of the multi-link data transmission method 300 can be understood with reference to the above embodiments, and thus the repetitious descriptions are not further given. The operations of the multi-link data transmission method 300 include exemplary operations, but those operations are not necessarily performed in the order described above. Operations of the multi-link data transmission method 300 may be added, replaced, changed order, and/or eliminated, or operations of the multi-link data transmission method 300 may be performed simultaneously or partially simultaneously as appropriate, in accordance with the spirit and scope of various embodiments of the present disclosure.

As described above, a communication device and a multi-link data transmission method provided in some embodiments of the present disclosure are able to utilize multiple links to simultaneously transmit multiple identical data, and another data is stopped being transmitted promptly when it is determined that the receiver device has received one data thereof. As a result, a simple control mechanism is employed to implement multi-link operations, ensuring the reliability of data transmission and reducing the frequency of retransmissions.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A communication device, comprising:
a transceiver circuit configured to wirelessly communicate with an electronic device via a first link and a second link; and
a controller circuit configured to control the transceiver circuit to transmit a first data to the electronic device via the first link and transmit a second data to the electronic device via the second link, receive a first response corresponding to the first data via the first link from the electronic device, and stop transmitting the second data according to the first response,
wherein the first data and the second data have the same content, a packet identifier of each of the first data and the second data is the same as each other, and the electronic device is further configured to determine whether to delete a later received one of the first data and the second data according to the packet identifier of the first data and the packet identifier of the second data after receiving the first data and the second data.

2. The communication device of claim 1, wherein the controller circuit is further configured to duplicate the first data to generate the second data.

3. The communication device of claim 1, wherein if the transceiver circuit has successfully transmitted the first data and the second data to the electronic device via the first link and the second link respectively and the controller circuit has not received a second response corresponding to the second data from the electronic device via the second link, the controller circuit is configured to stop transmitting the second data according to the first response.

4. The communication device of claim 1, wherein if the transceiver circuit has started transmitting the second data to the electronic device via the second link and the controller circuit has not received a second response corresponding to the second data from the electronic device via the second link, the controller circuit is configured to stop transmitting the second data according to the first response.

5. The communication device of claim 1, wherein if the controller circuit receives the first response before the transceiver circuit starts transmitting the second data to the electronic device via the second link, the controller circuit is configured to stop transmitting the second data according to the first response.

6. The communication device of claim 1, wherein the packet identifier is configured to indicate whether the first data and the second data are the same.

7. The communication device of claim 1, wherein the packet identifier is a sequence number.

8. The communication device of claim 1, wherein the first response is an acknowledgement frame or a block acknowledgement frame.

9. The communication device of claim 1, wherein the first link and the second link are a plurality of channels corresponding to different frequency bands.

10. A multi-link data transmission method, comprising:
transmitting a first data to an electronic device via a first link;
transmitting a second data to the electronic device via a second link, wherein the first data and the second data have the same content; and
receiving a first response corresponding to the first data from the electronic device via the first link, and stopping transmitting the second data according to the first response,
wherein a packet identifier of each of the first data and the second data is the same as each other, and the electronic device is further configured to determine whether to delete a later received one of the first data and the second data according to the packet identifier of the first data and the packet identifier of the second data after receiving the first data and the second data.

11. The multi-link data transmission method of claim 10, further comprising duplicating the first data to generate the second data.

12. The multi-link data transmission method of claim 10, wherein receiving the first response from the electronic device via the first link and stopping transmitting the second data according to the first response comprises:
if the first data and the second data have been successfully transmitted to the electronic device via the first link and the second link respectively and a second response corresponding to the second data has not been received from the electronic device via the second link, stopping transmitting the second data according to the first response.

13. The multi-link data transmission method of claim 10, wherein receiving the first response from the electronic device via the first link and stopping transmitting the second data according to the first response comprises:
if the second data has already started being transmitted to the electronic device via the second link and a second response corresponding to the second data has not been received from the electronic device via the second link, stopping transmitting the second data according to the first response.

14. The multi-link data transmission method of claim 10, wherein receiving the first response from the electronic device via the first link and stopping transmitting the second data according to the first response comprises:

if the first response is received before the second data is started being transmitted to the electronic device via the second link, stopping transmitting the second data according to the first response.

15. The multi-link data transmission method of claim 10, wherein the packet identifier is configured to indicate whether the first data and the second data are the same.

16. The multi-link data transmission method of claim 10, wherein the packet identifier is a sequence number.

17. The multi-link data transmission method of claim 10, wherein the first response is an acknowledgement frame or a block acknowledgement frame.

18. The multi-link data transmission method of claim 10, wherein the first link and the second link are a plurality of channels corresponding to different frequency bands.

* * * * *